United States Patent [19]

Roch

[11] 4,304,513
[45] Dec. 8, 1981

[54] MILLING MACHINE INCLUDING IMPROVED TOOL KNOCK-OUT MEANS

[75] Inventor: Gerald V. Roch, Indianapolis, Ind.

[73] Assignee: Hurco Manufacturing Company, Inc., Indianapolis, Ind.

[21] Appl. No.: 73,721

[22] Filed: Sep. 10, 1979

Related U.S. Application Data

[63] Continuation-in-part of Ser. No. 880,640, Feb. 23, 1978, Pat. No. 4,242,019.

[51] Int. Cl.³ .............................................. B23C 5/26
[52] U.S. Cl. ...................................... 409/233; 279/4; 279/8
[58] Field of Search .................. 409/233; 279/4, 8; 310/75 D

[56] References Cited

U.S. PATENT DOCUMENTS

| | | | |
|---|---|---|---|
| 1,636,560 | 7/1927 | Hall | 51/241 VS |
| 1,967,045 | 7/1934 | Wehmeyer | 279/1 H |
| 2,242,475 | 5/1941 | Misuraca | 279/43 X |
| 2,365,068 | 12/1944 | Gerbig | 29/26 R |
| 2,500,175 | 3/1950 | Guthrie | 310/75 D |
| 2,571,267 | 10/1951 | Ljunggren | 310/75 D |
| 2,703,847 | 3/1955 | Kalikow | 310/75 D X |
| 2,714,866 | 8/1955 | Pleuger et al. | 310/75 D |
| 2,772,546 | 12/1956 | Barrows | 310/75 D |
| 2,860,547 | 11/1958 | Stephan | 409/233 |
| 2,883,890 | 4/1959 | Fink et al. | 408/135 |
| 2,963,057 | 12/1960 | Morse | 408/236 |
| 3,023,675 | 3/1962 | Stephan | 409/233 |
| 3,038,386 | 6/1962 | Parske et al. | 409/233 |
| 3,157,283 | 11/1964 | Maass et al. | 29/568 |
| 3,177,775 | 4/1965 | Alisavskis | 409/233 |
| 3,220,313 | 11/1965 | Schroeder | 409/233 |
| 3,242,819 | 3/1966 | Erikson | 409/233 |
| 3,468,552 | 9/1969 | Mardone | 409/233 X |
| 3,490,333 | 1/1970 | Scruton | 409/233 |
| 3,520,228 | 7/1970 | Wohfeil | 409/233 |
| 3,555,963 | 1/1971 | Evans | 409/235 X |
| 3,617,142 | 11/1971 | Dewane | 409/175 |
| 3,673,918 | 7/1972 | Zankl | 409/141 |
| 3,678,801 | 7/1972 | Hague | 409/233 |
| 3,757,637 | 9/1973 | Eich et al. | 409/233 X |
| 4,068,559 | 1/1978 | Schmid, Jr. et al. | 409/233 |
| 4,131,054 | 12/1978 | Johnson | 409/233 |

FOREIGN PATENT DOCUMENTS

| | | | |
|---|---|---|---|
| 644827 | 10/1950 | United Kingdom | 51/213 |
| 761157 | 11/1956 | United Kingdom | 409/233 |
| 1516406 | 7/1958 | United Kingdom | 409/233 |
| 1246967 | 9/1971 | United Kingdom | 409/233 |
| 1338075 | 11/1973 | United Kingdom | 409/233 |

Primary Examiner—William R. Briggs
Attorney, Agent, or Firm—Woodard, Weikart, Emhardt & Naughton

[57] ABSTRACT

A milling machine includes a C-shaped frame, tool support member movable in a vertical direction, a saddle member movable in a transverse direction, a work table movable in a longitudinal direction, a tool drive unit, a tool knock-out assembly and two oppositely positioned and removable bearing ways associated with each direction of travel. For the vertical axis the bearing ways are between the C-shaped frame and the tool support member. The tool drive unit includes a hollow tool spindle and a drive motor with a vertically extending output shaft which is rigidly and coaxially connected to the hollow tool spindle. The tool knock-out assembly includes a spring-loaded tool collet assembly and a double-action air cylinder arranged in a surrounding coaxial relationship with the output shaft. The tool collet assembly includes a spindle shaft surrounded by a vertical stack of belleville spring washers and the distal end is fitted with a tool collet which includes six collet arms and this tool collet assembly is movable between a tool-gripped position and a tool-released position. Each vertical axis bearing way longitudinally extends in a vertical direction and includes a track shaft portion attached to the C-shaped frame and a bearing case portion attached to the tool support member. Reciprocating relative motion between the tool support member and the C-shaped frame occurs at the two bearing way locations and the drive motor for the tool moves with the hollow tool spindle in a vertical direction.

7 Claims, 11 Drawing Figures

MILLING MACHINE INCLUDING IMPROVED TOOL KNOCK-OUT MEANS

REFERENCE TO RELATED APPLICATIONS

This patent application is a continuation-in-part application of Ser. No. 880,640, filed Feb. 23, 1978, U.S. Pat. No. 4,242,019.

BACKGROUND OF THE INVENTION

This invention relates in general to milling machines and in particular to three-axis milling machines.

The technology associated with machine tools is extensive and diverse. Known in the art are one, two and three-axis machines, some of which grind or mill, others of which drill or bore. The types of attachments and options are almost as varied as the number of different machines. The following list of patents gives a brief indication of some of these various types of machines and features:

| U.S. Pat. No. | Patentee | Issue Date |
| --- | --- | --- |
| 3,555,963 | Evans | 1/19/71 |
| 3,617,142 | DeWane | 11/02/71 |
| 3,157,283 | Maass et al. | 11/17/64 |
| 2,963,057 | Morse | 12/06/60 |
| 2,883,890 | Fink et al. | 4/28/59 |
| 2,365,068 | Gerbig | 12/12/44 |

Evans discloses a multiple spindle transfer machine having a removable spindle tool holder and in which a single drive motor is used to drive each spindle through a gearing arrangement. The entire tool head moves in a vertical direction by means of a worm gear and pinion drive using guides and slides on each side thereof.

DeWane also discloses a vertically movable head in which a DC drive motor is geared to drive the tool spindle. The head is mounted to the structure by a slideway arrangement and movement occurs by use of a counterbalancing weight and pulley arrangement.

Each of these patents disclose conventional slideway or guide means for controlling the alignment of the vertical travel. Such means require accurate machining, lubrication and major overhaul by replacement or remachining when they become worn. Furthermore, each of these two patents utilize gearing to transfer the rotary motion of the motor shaft to drive the tool spindle.

The remaining four patents are listed as being of only general applicability to conventional three-axis machine tools. Each of these patents disclose a particular unique application or feature which might be associated with a particular machine tool. Maass et al. discloses mandrel-changing means for a tube-extrusion press. Morse discloses a multi-purpose machine tool with means for varying the spindle position. Fink et al. discloses an automatic drill changer for chucks. Gerbig discloses a machine for reconditioning insert-type connecting rods.

The following list of patents deals with drive units and mechanisms which have hollow shaft motors or the like:

| U.S. Pat. No. | Patentee | Issue Date |
| --- | --- | --- |
| 1,636,560 | Hall | 7/19/27 |
| 1,967,045 | Wehmeyer | 7/17/34 |
| 2,500,175 | Guthrie | 3/14/50 |
| 2,571,267 | Ljunggren | 10/16/51 |
| 2,703,847 | Kalikow | 3/08/55 |
| 2,772,546 | Barrows | 12/04/56 |
| 3,854,063 | Bergman | 12/10/74 |
| 3,987,322 | Bourgain et al. | 10/19/76 |
| 2,714,866 | Pleuger et al. | 8/09/55 |

The Hall patent discloses a hollow shaft motor employed for a valve seat grinder in which the hollow shaft is used to accommodate a pilot stem.

The Wehmeyer patent relates to machine tools only in that it includes a chuck-operating motor which is mounted on a lathe spindle.

The Guthrie patent discloses a flexible coupling concept associated with direct-current, reversible step motors.

The Ljunggren patent discloses a thread-spinning spindle having a hollow shaft motor drive for the blade which drives the spool through a flexible coupling.

The remaining patents are of only general applicability in that they do not relate to conventional drive motors for use with three-axis machine tools. In addition, none of these listed patents involves the concept of the coaxial coupling of a conventional solid output shaft of a motor to a hollow tool chucking spindle. This particular coaxial coupling concept provides the advantages of individually replaceable parts, without having to replace the entire assembly, and the ability to use standard, commercially available motors.

Kalikow discloses a driving mechanism for starter-generators. Barrows discloses a flexible drive concept for absorbing or reducing torsional vibration. Bergman discloses an arrangement for directly coupling an electric motor to the shaft of driven equipment which permits a small misalignment. Bourgain et al. discloses a coupling device for use between an electric motor and an element which is driven at high speeds and suspended from a connecting rod. Pleuger et al. discloses a device for propelling a ship and includes an electric motor.

U.S. Pat. No. 2,028,727 issued Jan. 21, 1936 to Perry et al. discloses a particular construction of machine tools wherein the tools are distinctly segregated into a number of major structural units. One aspect of this segregation is that the tool head is readily detachable from a saddle member and the saddle member is readily detachable from the vertical support column of the subject machine tool. Although the saddle member is slidable on the ways of the vertical column, this design in no way solves the problems of machining accuracy, lubrication and wear associated with such slide and guide arrangements as previously discussed.

The following list of patents deals with tool knock-out devices associated with machine tools:

| U.S. Pat. No. | Patentee | Issue Date |
| --- | --- | --- |
| 3,673,918 | Zankl | 7/04/72 |
| 3,220,313 | Schroeder | 11/30/65 |
| 3,757,637 | Eich et al. | 9/11/73 |
| 3,520,228 | Wohlfeil | 7/14/70 |
| 2,242,475 | Misuraca | 5/20/41 |

Zankl discloses an adjustable vibration dampener for a slidable machine tool member such as a spindle head. The dampening means are particularly adapted to selectively and adjustably compensate for vibration due to the anti-friction support means in such a manner as to increase the quality and depth of a particular metal-cutting operation by overcoming the tendency to vibration. Disclosed as part of this device is the use of belleville spring washers in combination with a circular bearing shoe which is resiliently urged axially inward to exert a predetermined frictional pressure against a vertical way.

Schroeder discloses a machine tool power drawbolt mechanism arranged within a hollow spindle member of a machine tool. The threaded engagement between the drawbolt and the tool holder represents a somewhat conventional construction but is not suitable for a quick release, tool knock-out arrangement.

Eich et al. discloses a device for the automatic replacement and adjustment of tool carriers, such as angular milling heads on a milling support on a machine tool. This device is of interest for its showing of a drawbar arrangement which is axially slidable and rotatably mounted in the milling spindle. This design also represents a somewhat conventional drawbar or drawbolt construction wherein the drawbar is externally threaded and screwed into the tool shank before the actual axial movement of the drawbar takes place by means of the motor.

Wohlfeil discloses a machine tool control system with control circuits for arresting rotation of a machine tool spindle in a fixed rotary orientation position. The system includes a drawbolt which is used to secure work tools in the spindle and is rotatable relative to the spindle to release one work tool and grip another. Also included is a control circuit for sensing any failure of the drawbolt to properly rotate relative to the spindle.

Misuraca discloses a motorized hand tool such as that associated with small grinding wheels, abrasive elements, drills and electric erasers. This device is listed for its showing of a hollow spindle and a release mechanism for the particular element held in the hollow spindle.

SUMMARY OF THE INVENTION

A knock-out mechanism for spindle-driven tool holders and tooling attachments according to one embodiment of the present invention comprises a cylinder body, a cylinder piston positioned within the cylinder body and movable in response to pressure forces within the cylinder body between an extended position and a retracted position, a spindle assembly having a proximal end arranged for coupling to a motor output shaft, and a spring-loaded tool collet assembly disposed within the spindle assembly and longitudinally movable in response to cylinder piston movement, the spindle assembly further includes a distal end cooperatively arranged with the spring-loaded tool collet assembly for alternately retaining and releasing tooling attachments.

One object of the present invention is to provide an improved tool knock-out construction for milling machines and similar machine tools.

Related objects and advantages of the present invention will be apparent from the following description.

DESCRIPTION OF THE PREFERRED EMBODIMENT

Figure 1:
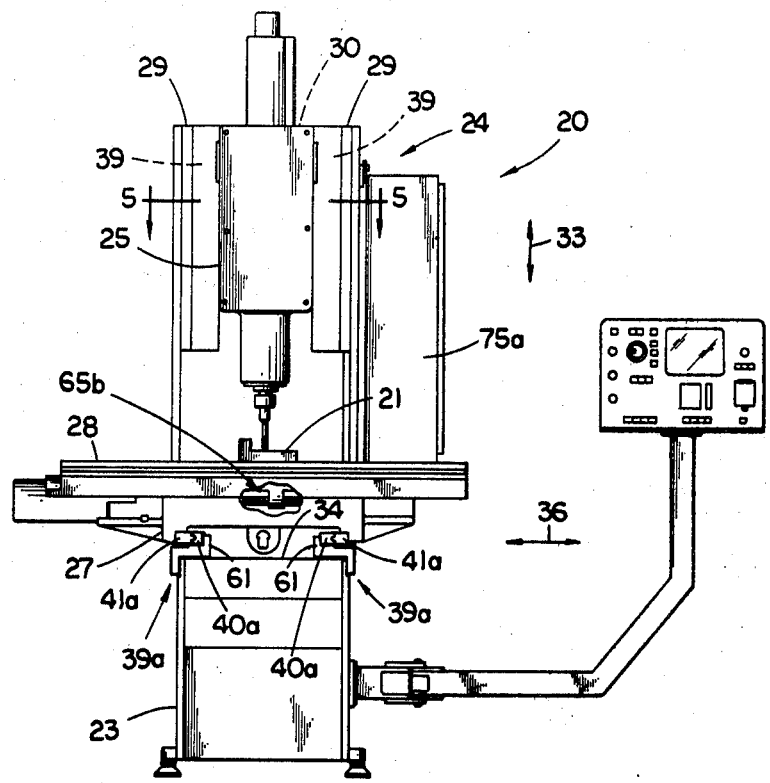
FIG. 1 is a front elevation view of a milling machine according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
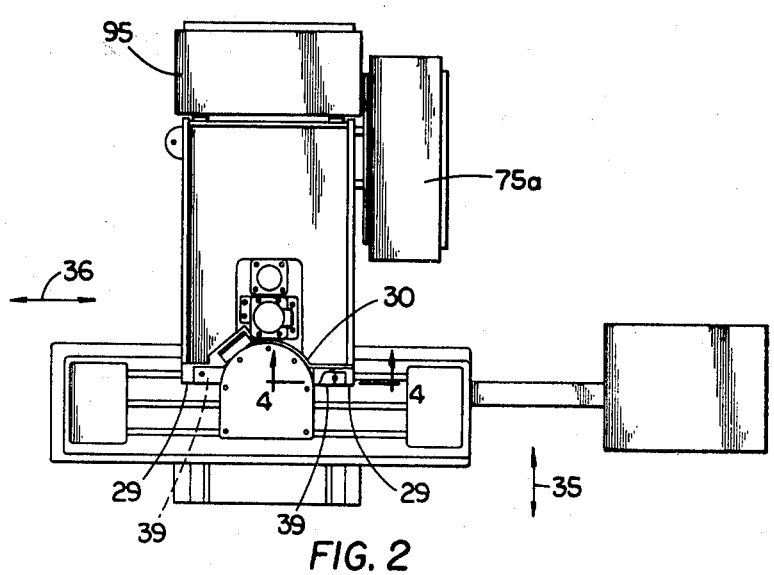
FIG. 2 is a top plan view of the FIG. 1 milling machine.
Figure 3:
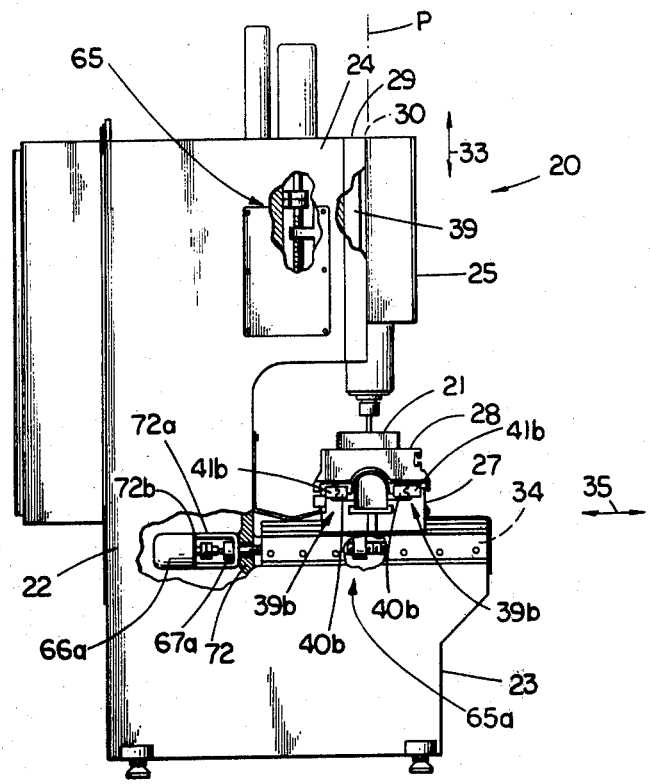
FIG. 3 is a side elevation view of the FIG. 1 milling machine with portions in section to show internal features.

Referring to FIGS. 1, 2 and 3, milling machine 20 is oriented as it would be when in use for the machining of a particular workpiece 21. Milling machine 20 includes a C-shaped frame 22 having a base portion 23 and an overhanging upper portion 24, a tool support member 25, a saddle member 27 and a work table 28. The C-shaped frame is a steel weldment which is structured and machined so as to accommodate various controls, attachments and drive systems which are necessary for the operation of milling machine 20. The overhanging upper portion 24 includes a pair of outwardly extending arms 29, one on each side of upper portion 24, and a recessed area 30 therebetween. These two arms 29 support tool support member 25 and provide means for reciprocating vertical travel in the direction of arrow 33 while the entire C-shaped frame and in particular base portion 23 remain rigid and stationary. Above the upper surface 34 of base portion 23 there is housed an appropriate drive mechanism for the transverse movement of saddle member 27 in the direction of arrow 35. A further drive mechanism is positioned between saddle member 27 and work table 28 so as to effect longitudinal travel of work table 28 in the direction of arrow 36 (see FIG. 2). These various drive systems, which will be described in detail hereinafter, and their corresponding directions of movement means that milling machine 20 is similar to a conventional three-axis machine with arrow 36 indicating the X direction of travel, arrow 35 indicating the Y direction of travel and arrow 33 indicating the Z direction of travel. It is noted that, regardless of the direction of movement or the combination of movements during a machining operation, the C-shaped frame remains stationary and there is no relative movement of any major structural portion of that frame. With conventional column-and-knee-type milling machines, the relative movement in the vertical direction between the workpiece and the tool spindle is typically controlled by raising or lowering the knee platform, which supports the work table and saddle member, by means of a motor-driven lead screw and nut combination. The spindle may also have a smaller vertical travel inside of a stationary quill or head. The present invention represents a departure from this conventional column-and-knee-type design because the tool support member, rather than a knee, is movable in the vertical direction and a rigid C-frame extends from below the spindle axis to points on both sides of the spindle in a vertical plane immediately adjacent the spindle axis. Thus, the support for the saddle and table is much more rigid than usual, enabling achievement of greater machining accuracies with the machine than would otherwise be possible. As a workpiece is positioned and moved in the transverse and longitudinal directions, milling or other machining of that workpiece is accomplished by lowering the entire tool support member to its point of machining contact with the particular workpiece and then causing movement along whichever axes are desired, depending on the particular task at hand. There is no vertical movement of the saddle member 27 and work table 28.

Figure 11:
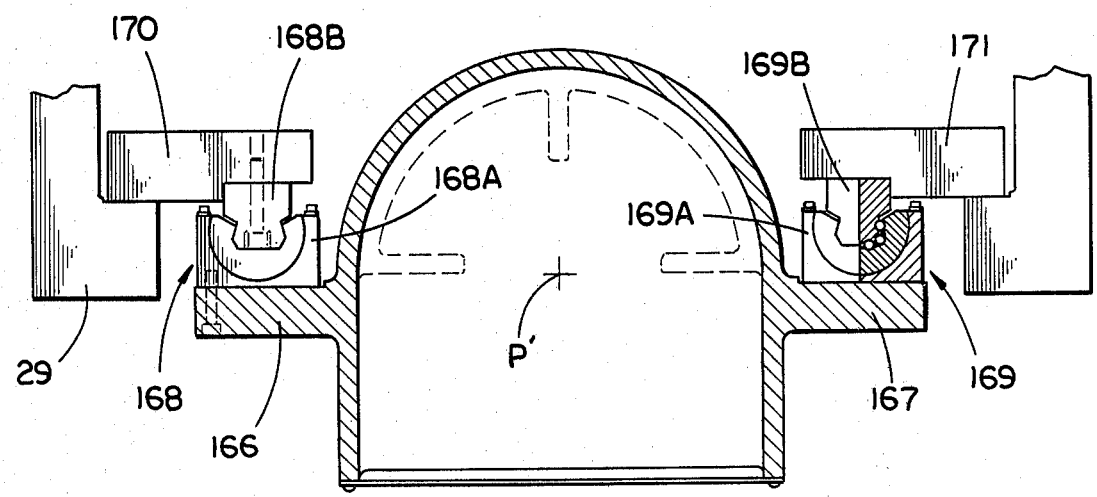
FIG. 11 is a fragmentary top plan view of a bearing way assembly suitable for use with the FIG. 1 milling machine.

Tool support member 25 is suspended by and between outwardly extending arms 29, and positioned on opposite sides of tool support member 25 are two bearing way assemblies. While one bearing way assembly arrangement is illustrated in FIGS. 4–7, the exemplary embodiment is illustrated in FIG. 11 and this arrangement will be described in greater detail hereinafter.

Each ball bearing way 39 (see FIGS. 4 and 5) includes an outer race portion 40 and an elongated ball circulating track 41 having a tapered surface along one side. Each outer race portion 40 is rigidly attached by means of conventional fasteners, such as socket head cap screws, to the corresponding outwardly extending arm 29 while the ball circulating track is rigidly attached, also with conventional fasteners, such as socket head cap screws, to the tool support member 25. By means of a suitable drive syste, such as a ball lead screw and recirculating ball nut system, tool support member 25 is raised and lowered for travel in the vertical direction with the relative motion between tool support member 25 and the C-shaped frame 22 (outwardly extending arms 29) occurring at the location of ball bearing ways 39. Each bearing way 39 is independently removable from the milling machine 20, by means of conventional small hand tools, so that when there is ball bearing fatigue or failure or other structural damage to some portion of either bearing way 39, the affected bearing way can be independently replaced without the necessity to tear down, remachine or otherwise conduct a major overhaul of the milling machine.

The two ball bearing ways 39 used for vertical travel of tool support member 25 are installed and preloaded so that there is the equivalent of zero running clearance between tool support member 25 and the C-shaped frame 22. In order to achieve this zero running clearance and maintain rigid structural strength, a special installation procedure is used.

Each outwardly extending arm 29 has a vertically extending series of internally threaded bolt holes 46 whose location is indicated by line 45. These bolt holes 46 are used to rigidly secure outer races 40 into the L-shaped recess 47 of each arm 29 by means of suitable threaded fasteners passed through clearance holes 46a of outer race 40. Each outer race 40 has a semicircular channel 48 which carries a continous series of ball bearings 49. For proper ball bearing movement within each bearing way 39, outer race 40 and circulating track 41 are mounted to their respective structural supports so that semicircular channels 50 (of track 41) and 48 (of race 40) cooperate to form a circular passageway 51 having a size slightly larger than the diameter of the ball bearings 49 therein.

Each flange member 25a and 25b of tool support member 25 has a series of internally threaded bolt holes 52 whose location is indicated by line 53. Before circulating track 41 can be rigidly fastened in place to flange members 25a and 25b, the spacing between lines 45 and 53 must be accurately set so that semicircular channels 48 and 50 are positioned to form circular passageway 51. Due to machining tolerances, the dimensional spread between lines 45 and 53 on each side of tool support member 25 may vary by plus or minus a few thousandths of an inch. Consequently, after each outer race 40 is rigidly fastened to its corresponding outwardly extending arm 29, any spacing variations must be accounted for by movement of track 41. Track 41 has a series of clearance holes 54 which are substantially coincident with internally threaded bolt holes 52. Clearance holes 54 are large enought to permit a slight lateral shift of track 41 while still providing sufficient overlap with bolt holes 52 for suitable threaded fasteners to pass through the clearance holes 54 and be threadedly received by the bolt holes 52. In order to provide a rigid structure for supporting circular track 41 and to accommodate these tolerance variations, a built-in, tapered wedge 55 (see FIG. 6) which, when tapped downwardly into position pushes circulating track 41 into proper position with respect to outer race 40. Once this is done, the threaded fasteners selected for joining circulating track 41 to tool support member 25 (through holes 54 and 52) are tightened in place. Extending lengthwise in the aproximate center of one surface of tapered wedge 55 is a ball bearing groove 56 which provides a hard bearing surface for that contact which may be made with the circulating ball bearings in trough 57 of track 41.

Ball bearings 49 extend in a continuous loop throughout circular passageway 51 and trough 57. When there is upward vertical movement of tool support member 25, these ball bearings rotate about their own axis as well as travel in a clockwise direction in the right-hand track 41 (counterclockwise in the left-hand track 41) through the continuous loop. When the vertical movement of tool support member 25 is downward, there is a counterclockwise ball bearing travel in the right hand track 41 and clockwise travel in the left-hand track. Inasmuch as outer race 40 and circulating track 41 are generally rectangular members, the oblong, curved end appearance of this continuous loop is provided by securing a ball bearing guide cap 58 (see FIG. 7) to each end of bearing ways 39. Cap 58 has a semicircular, tapered edge 59 on one side so as to fit into and against the inner surface of semicircular channel 48 of outer race 40 while the opposite edge 60 of cap 58 is squared off and fits atop the corresponding end of circulating track 41. As tool support member 25 moves vertically, the ball bearings move in either a clockwise or counterclockwise direction and are guided out of circular passageway 51 and into trough 57 by means of edge 59.

Each cap 58 has a curved inner portion which accepts the ball bearings and accommodates their travel from one side of the continuous loop to the other side. Each cap 58 is secured to a different end of circulating track 41 by threaded fasteners. Each cap is easily removable in order to facilitate both the initial loading of the ball bearings as well as the replacement of worn bearings which may be required at a later time. Attached to the end of each cap 58 is a wiper 58a which slides across semicircular channel 48 wiping off dirt and other contaminants prior to contact by the ball bearings.

Figure 5:
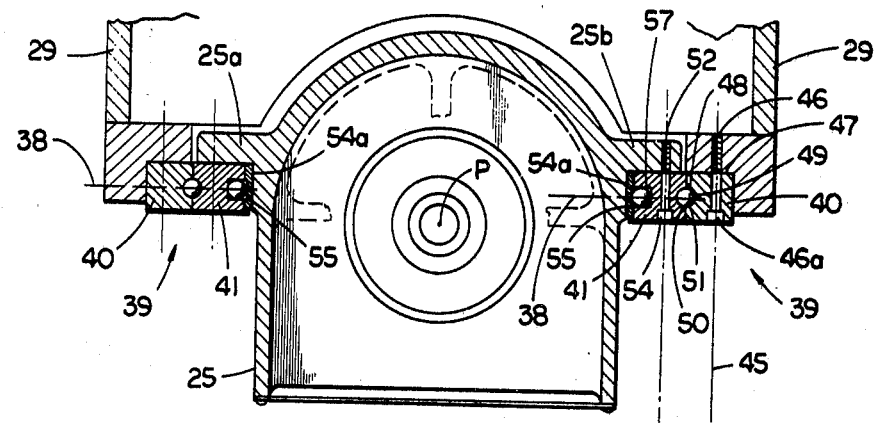
FIG. 5 is a section view of the FIG. 4 ball bearing way taken along line 5—5 in FIG. 1.
Figure 6:
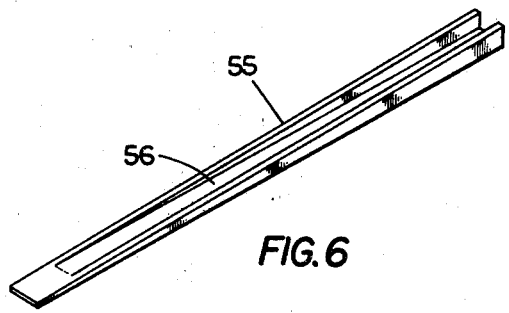
FIG. 6 is a perspective view of a tapered wedge comprising a portion of the FIG. 1 milling machine.
Figure 4:
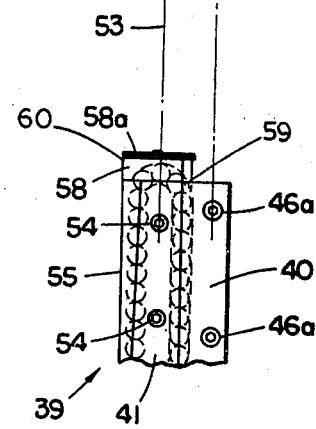
FIG. 4 is a section view of a ball bearing way comprising a portion of the FIG. 1 milling machine taken along line 4—4 in FIG. 2.
Figure 7:
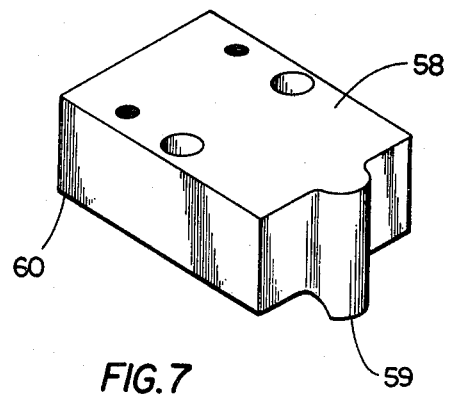
FIG. 7 is a perspective view of a ball bearing guide cap comprising a portion of the FIG. 1 milling machine.

Each ball bearing guideway 39 has a plane of vertical travel indicated by line 38 (FIG. 5). Inasmuch as lines 38 (planes) are coincident with each other they can be thought of as lying within a common plane. An important feature of the disclosed milling machine is that this common plane coincides closely with the rotational axis "P" (FIG. 5) of the tool support spindle. In the disclosed embodiment the actual distance of separation between point P and the plane common to lines 38 is ideally zero, but in reality is less than one inch. This relationship virtually eliminates any cantilever effects which might otherwise exist if the plane of vertical travel and the axis of the tool support member were more widely separated.

The description of ball bearing ways 39 is typical for each of the three axes. As noted, relative motion in the vertical direction occurs between tool support member 25 and outwardly extending arms 29 of the C-shaped frame 22. Another pair of ball bearing ways 39a is located between surface 34 and saddle member 27 wherein the outer races 40a are attached to the upright stationary brackets 61 and the movable circulating tracks 41a are attached to saddle member 27. Similarly, the final pair of ball bearing ways 39b are located between saddle member 27 and work table 28, with the outer races 40b being attached to work table 28 while the movable circulating tracks 41b are attached to the saddle member 27. The structural details of each pair of ball bearing ways 39, 39a and 39b are identical except for their differences in overall length which is governed by the selected extent of travel in each axis and the particular design of the milling machine. Vertical travel is approximately 14 inches, transverse travel approximately 13 inches and longitudinal travel approximately 26 inches. It is conceivable that types of anti-friction bearing means other than ball bearings might be usable in certain combinations. Some examples of other anti-friction bearings are roller bearings and needle bearings. It is believed that ball bearings provide the best combination of benefits.

Figure 8:
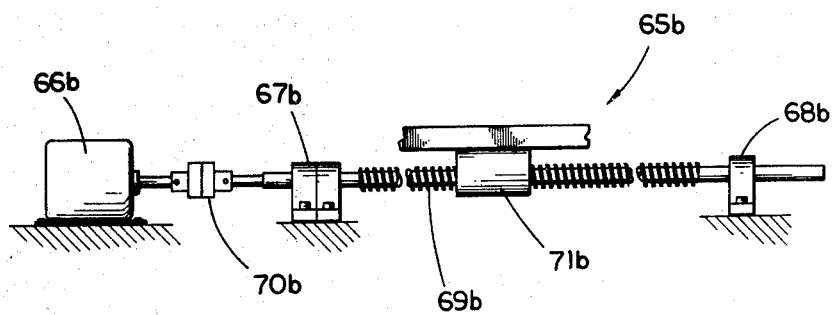
FIG. 8 is a diagrammatic illustration of a lead screw drive system comprising a portion of the FIG. 1 milling machine.

Associated with each pair of ball bearing ways 39, 39a and 39b and their corresponding axis is a ball lead screw and recirculating ball nut drive system 65, 65a and 65b respectively (see FIG. 8). Each drive system 65, 65a and 65b is of virtually the same construction, the one difference being the length of the ball lead screw which corresponds to the extent of travel possible for the particular milling machine axis with which the drive system is associated. Another difference is that the X-axis drive system 65b extends over a greater distance and requires two end support bearings (67b and 68b) while the Y-axis and the Z-axis drive systems 65a and 65, respectively, are shorter in length and require only one end supporting bearing. Only drive system 65b will be described in detail, it being understood that systems 65a and 65 are substantially the same.

Mounted to the stationary member is a DC drive motor 66b, an oppositely facing pair of angular contact ball bearings 67b and ball bearing 68b. The use of oppositely facing angular contact ball bearings permits the handling of thrust loads occurring in both directions. For the vertical (Z) axis, this stationary member is C-shaped frame 22. For the longitudinal (X) axis, this stationary member is saddle member 27. For the transverse (Y) axis, this stationary member is the internal vertical surface 72 at the throat of C-shaped frame 22. It should be noted that the arrangement of the FIG. 8 drive system is modified slightly for the transverse axis in that a U-bracket 72a is mounted to surface 72 and a cover plate 72b attaches to the open end of the U-bracket. The end of the motor 66a mounts to cover plate 72b, and within U-bracket 72a support bearings 67a are positioned.

A suitable motor for these lead screw drives is a model E-703 permanent magnet DC motor offered by Electro-Craft Corporation of Hopkins, Minnesota. Drive system 65b further includes a ball lead screw 69b, alignment coupling 70b and recirculating ball nut 71b. Ball nut 71b is rigidly secured to the movable member which for the vertical axis is tool support member 25, for the transverse axis is saddle member 27 and for the longitudinal axis is work table 28. As the output shaft of motor 66b rotates at a selectable speed, alignment coupling 70b transmits the rotary motion to the lead screw 69b, which is threadedly received within recirculating ball nut 71b, and causes the corresponding movable member to travel along the lead screw. Lead screw 69b is supported at opposite ends by ball bearings 67b and ball bearing 68b to insure straight alignment and a smooth, continuous movement in response to motor 66b.

Figure 9:
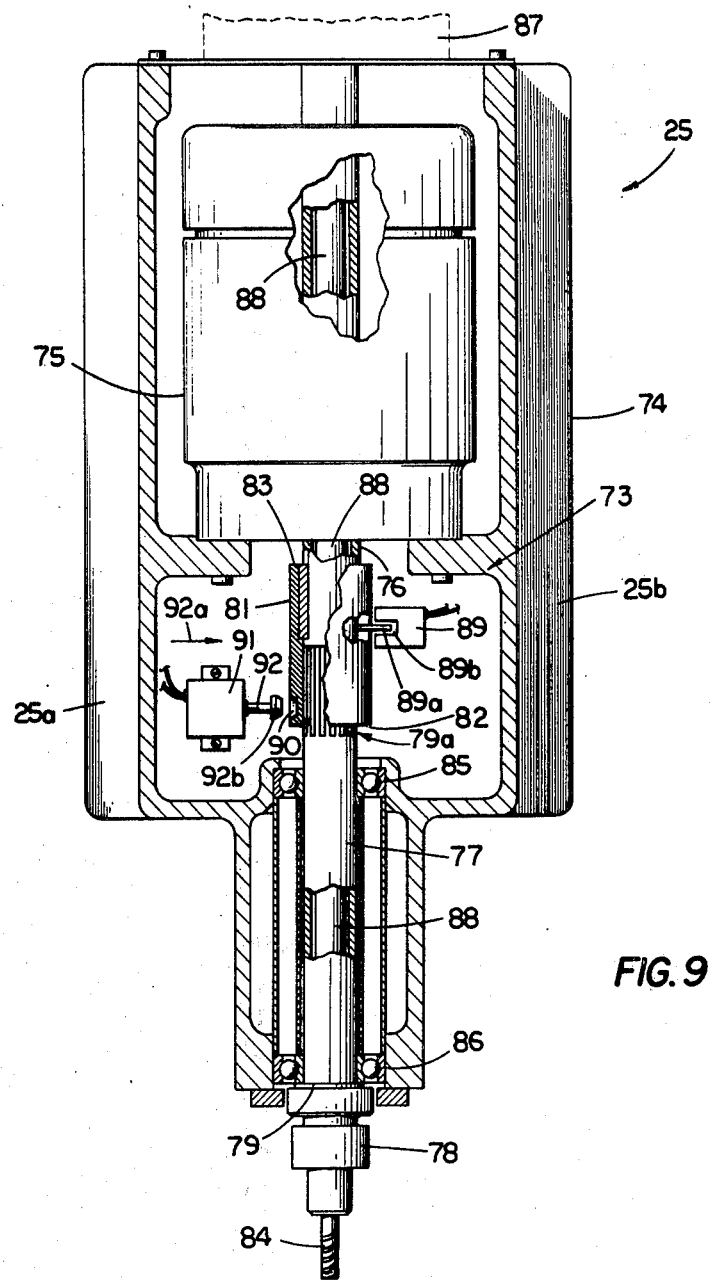
FIG. 9 is a fragmentary front elevation view of a tool support and tool drive unit comprising a portion of the FIG. 1 milling machine.

Referring to FIG. 9, one arrangement of tool support member 25 is shown in greater detail. The outer frame member 74 includes flange members 25a and 25b which are the structural members to which circulating tracks 41 are mounted. Frame member 74 also houses a tool drive unit 73 which includes a variable frequency AC drive motor 75 having a vertically extending hollow output shaft 76, and a hollow spindle 77 having tool chucking means 78 at one end 79 of the hollow spindle. Drive unit 73 provides rotary motion to the particular tool or milling cutter being used. The opposite end 79a of hollow spindle 77 is splined and is positioned coaxial to the output shaft 76 of motor 75. Splined end 79a of hollow spindle 77 is securely coupled to output shaft 76 by means of splined and keyed coupling 81. The internal portion of one end 82 of coupling 81 is correspondingly splined so as to engage splined end 79a of hollow spindle 77 and the opposite end 83 of coupling 81 mates with output shaft 76 and is keyed thereto in a conventional manner. Hollow spindle 77 is supported within structural frame 74 by means of bearings 85 and 86 so that there will be a true and accurate rotation of the milling cutter in response to the rotation of the output shaft 76 of drive motor 75. The axis of rotation of spindle 77 coincides with the longitudinal axis of the tool support member 25 as indicated by point P in FIG. 5. Tool chucking means 78 is used for securely holding an appropriate milling cutter 84 or similar tool. This tool chucking means may be either a manual or automatic device and the entire tool support and tool drive system is usable with an automatic tool changer a portion of which is shown by block 87 in which case the plunger portion 88 of the changer is located within hollow spindle 77. The output shaft 76 of motor 75 may be solid if automatic tool changing is not incorporated, and the tool changing will be done manually. When an automatic tool changer is used, the motor may preferably have a hollow motor shaft arrangement as shown, in order to accommodate the tool securing and releasing plunger 88 which extends from the plunger operating mechanism (in block 87, FIG. 9) downward into the spindle.

A variable frequency motor controller is electrical control box 75a (see FIGS. 1 and 2) functions with variable frequency AC drive motor 75 to provide a constant 2 horsepower output over the range of speeds betwen approximately 400 rpm and 3500 rpm. With such an arrangement the torque will vary with the speed, but the horsepower will be held constant by electrically limiting the motor output.

A further feature of milling machine 20 is the monitoring of spindle rpm and the stopping of spindle rotation and subsequent locking of the spindle for purposes of tool changing and the like. Located within structural frame 74 and adjacent coupling 81 are an air cylinder 91 and a photoelectric switch 89. A circular tapered indentation 90 is machined into the lower portion of coupling 81 and in line with indentation 90 is the actuatable plunger 92 of cylinder 91. When actuated, plunger 92 moves in the direction of arrow 92a to an extended position contiguous to the surface of coupling 81. Positioned on the end of plunger 92 is a circular tapered plug 92b which is sized to seat within indentation 90 and will prevent continued spindle rotation when so seated. Although once plunger 92 is actuated plug 92b may initially ride against the surface of coupling 81, if the indentation is not in line, when the indentation rotates into alignment, plug 92b will snap into indentation 90 and stop further rotation of spindle 77.

Spring pin 89a is inserted into a drilled hole in the upper portion of coupling 81 where it is securely held. The outwardly extending end of pin 89a passes through slot 89b of photoelectric switch 89. With milling machine 20 in use there is a path of light, created by one side of switch 89, which passes across slot 89b and is sensed on the opposite side, and with each revolution of coupling 81, pin 89a passes through this path of light causing a momentary break. By means of suitable conventional electronic circuitry within electrical control box 95 (FIGS. 2 and 3) these momentary breaks may be counted to produce a signal representative of spindle speed. When it is desired to stop spindle 77 for a change of tools, or for some other reason, an appropriate operator control turns off power to motor 75 and the rate of rotation decreases. When the spindle speed is low enough, cylinder 91 is energized and actuates plunger 92 into an extended position against coupling 81 and ultimately into indentation 90. A suitable optical switch for this application is a model CL 155 offered by Clairex Electronics of Mount Vernon, N.Y.

Automatic tool changer and the necessary tool holder apparatus are not specifically detailed herein except for the positional location of the changer portion indicated by block 87 and the plunger and their relationship to the drive motor 75 and hollow spindle 77. It is to be understood that the particular tool changer and tool holder selected will depend upon the size of milling machine 20 and the various machining capabilities desired, and inasmuch as such apparata are well known in the art, further mechanical and electrical details are not felt to be necessary.

By mounting a variable speed AC drive motor 75 of ample power potential in a direct coaxial arrangement with hollow spindle 77 and securing both members within structural frame 74, there is no need for gears, belts or pulleys in order to effect a variety of desirable speeds of rotation of the particular milling cutters which may be inserted within tool chucking means 78.

Figure 10:
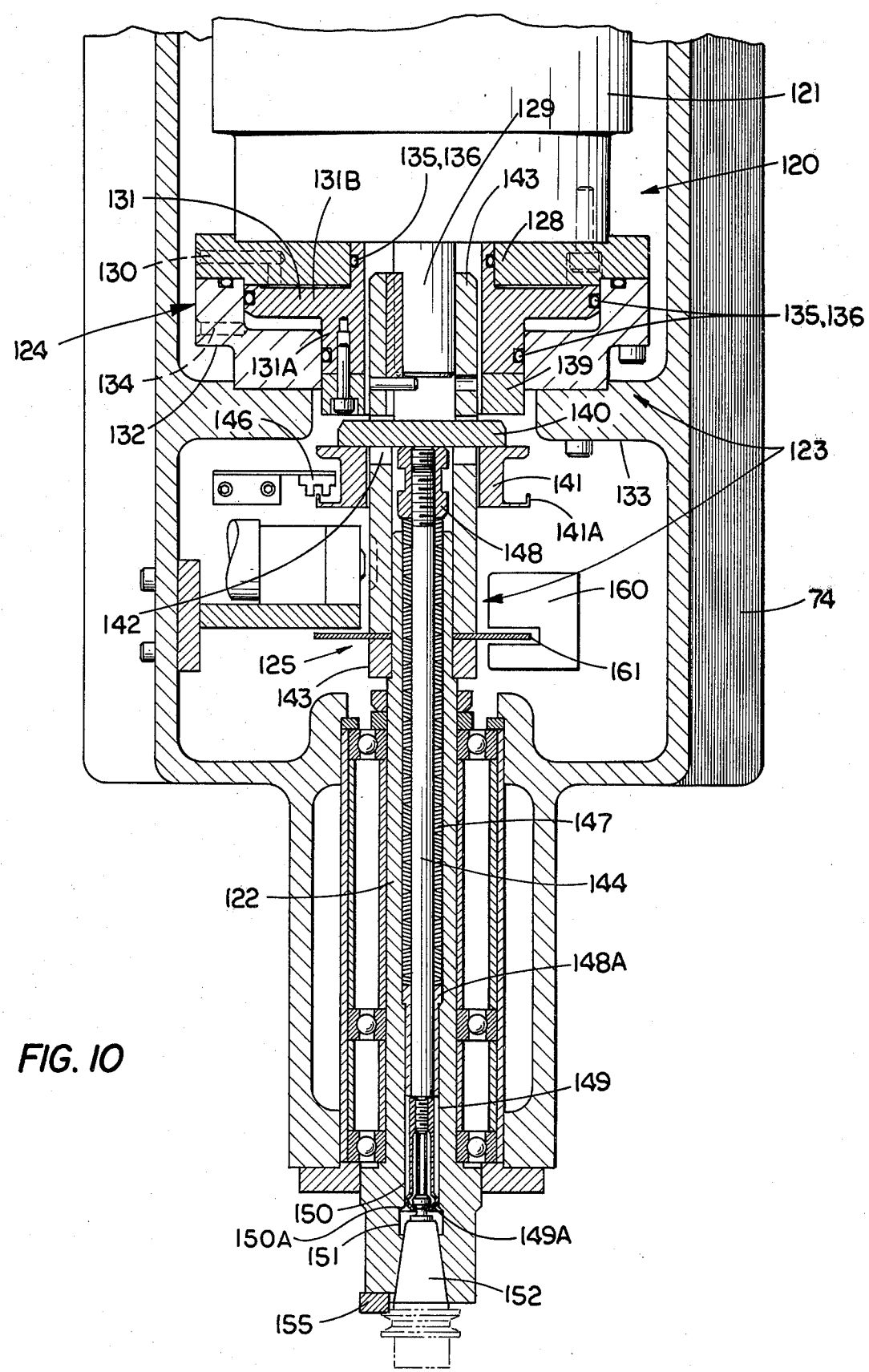
FIG. 10 is a fragmentary front elevation view of an alternative tool support and tool drive unit suitable for use as a portion of the FIG. 1 milling machine.

While the FIG. 9 arrangement of tool support member 25 presents a number of desirable features, such as the direct drive, the hollow spindle, the constant 2 horsepower output, the monitoring of spindle RPM and spindle locking, these features can be preserved with a variety of alternative arrangements. One such alternative arrangement is illustrated in FIG. 10 and this arrangement constitutes a preferred embodiment due to the incorporation of a novel tool knock-out mechanism.

The hollow motor and automatic tool changer (block 87) construction of FIG. 9 requires a somewhat special motor design and a separate subassembly for the tool changer. While block 87 is referred to as part of an automatic tool changer, it is to be understood that block 87 and plunger portion 88 serve as knock-out means for milling cutter 84. In contrast to the FIG. 9 arrangement, the FIG. 10 arrangement includes as part of its tool knock-out mechanism an annular air cylinder (donut-shaped) positioned within outer frame member 74 and disposed around and concentric with the output shaft of the drive motor. The remainder of the knock-out mechanism is located in and around the spindle. This piece-by-piece construction, as compared to a purchased subassembly, allows the interior portions of the frame member and the spindle to be utilized as part of the tool-changing structure and thereby provides a more compact tool support member. This type of construction concept also enables the replacement of parts on an individual basis rather than requiring a complete switch of tool knock-out subassembly for a replacement subassembly. Furthermore, the preferred tool knock-out mechanism of FIG. 10, which will be described in greater detail hereinafter, is quite reliable, provides a high degree of rigid and stable movement and is compatible with a variety of tool-holder magazines and tool-changing mechanisms.

Tool support member 120 includes outer frame member 74, drive motor 121, hollow spindle 122, knock-out mechanism 123 and a number of associated component parts, many of which correspond to the FIG. 9 arrangement and identical component parts have retained their same reference numerals. Knock-out mechanism 123 includes a double-action annular air cylinder 124 and a spring-loaded tool collet assembly 125. The annular air cylinder includes a cylinder cap 128 bolted upwardly into the face of drive motor 121 around the exit location of motor output shaft 129. Cylinder cap 128 includes an air inlet/outlet port 130 which extends inwardly to a location adjacent cylinder piston 131. Bolted to the underside of cylinder cap 128 is cylinder body 132. Cylinder body 132 is also bolted to the casting shelf 133 of frame member 74 and includes an air inlet/outlet port 134. Cylinder piston 131 includes a central hub portion 131A and an outwardly extending flange portion 131B. Cylinder piston 131 is disposed within the hollow interior portions of cap 128 and body 132 and within the space created between cylinder cap 128 and cylinder body 132. Piston 131 is annular in shape and surrounds motor output shaft 129. Flange portion 131B is disposed with the space (annular groove in shape) between cap 128 and body 132 and piston 131 is movable in response to air pressure in a vertical (longitudinal with respect to the spindle axis) direction between an extended orientation and a retracted orientation. Included as part of piston 131 are three annular O-ring grooves 135 and disposed therein are three O-rings 136 which provide the necessary sealing against leakage. Bolted to the leading or advancing surface of cylinder piston 131 is a piston face ring 139 which contacts and applies a force to release bar 140 as piston 131 advances.

As air is forced into port 130, it orients itself uniformly across the entire top surface of cylinder piston flange 131B between the flange top surface and cylinder cap 128 bottom surface. As the pressure builds, these surfaces separate causing the piston to move downwardly and as this occurs, the air trapped between the bottom surface of the piston and the top surface of cylinder body 132 is forced out and piston face ring 139 begins to act against the top surface of release bar 140. Release bar 140 is bolted to a cam ring 141 and the bar extends through a diametral slot 142 in spindle coupling 143. This slot is machined to a width dimension for a snug fit with release bar 140 and the height of this slot is sufficient to provide clearance for longitudinal (vertical) movement of release bar 140.

Cam ring 141 includes an outwardly extending lip with a raised edge 141A at its outermost extension and this raised edge is positioned within the slot of optical switch 146. When a tool (tool holder) is gripped by knock-out mechanism 123, edge 141A will be drawn upwardly to a location short of the actuation point for switch 146. However, when no tool is being gripped, the design of mechanism 123 enables edge 141A to be drawn upwardly to a higher point whereby switch 146 is activated and serves as an indicator to the machine operator that no tool or tool holder is presently loaded within the spindle collet.

Spindle coupling 143 is splined and pinned to the motor output shaft 129 and is also splined and pinned to spindle 122. There is a nominal clearance between release bar 140 and piston face ring 149 so that when the spindle is driven by the motor, the annular cylinder is unaffected.

Disposed within spindle 122 is a spindle shaft 144 surrounded by an extended length stack of belleville spring washers 147. Threaded onto the top end of shaft 144 is a retaining cap 148 which acts as one stop (abutting surface) against the stack of spring washers. A similar cap 148A is located at the opposite end of the stack. Shaft 144 is free to move within the inside diameter of the belleville spring washers such that as force is applied to cap 148 by way of release bar 140, by way of piston face ring 139, by way of piston 131, the washers are compressed, as evidenced by a reduction in stack height, and shaft 144 advances downwardly. Threaded to the distal end of spindle shaft 144 is a collet member 149 which has a segmented plurality of collet arms 149A (six arms total in the exemplary embodiment). In a tool loaded condition, this plurality of collet arms is inwardly compressed into a spring-loaded condition within smaller cylindrical bore 150 located at the distal end of spindle 122. The smaller cylindrical bore is in essence in a concentric (counterbore) relationship with larger cylindrical bore 151 such that bore 151 is adjacent the distal end of bore 150, the two bores being separated by a chamfered surface 150A.

As spindle shaft 144 advances, a result of sufficient air pressure acting on flange 131B of piston 131, collet member 149 also advances until the distal gripping ends of the collet arms 149A extend into larger cylindrical bore 151. One such added clearance is provided for collet arms 149A, they spring outwardly along chamfered surface 150A releasing from their grip whatever tool holder 152 or tool or tooling attachment was previously held. Such a tool holder or tooling attachment requires a reduced diameter portion beneath an enlarged head for the arms to extend into and therebeneath, respectively. Such tool holder designs are relatively standard within the industry.

Rotary motion to the tool holder is transmitted from the motor output shaft 129 to spindle 122 by means of spindle coupling 143 and then from the spindle to the tool by means of drive key 155. Drive key 155 is bolted to the end of the spindle and fits snugly within a mating keyway in the collar of the tool holder. This snug fit assures true and accurate response to drive motion and the drive key is the sole means of transmitting spindle rotation to the tool holder (and tool). The tool holder also has a second keyway-like recess located 180 degrees from the mating keyway for drive key 155. This second keyway provides an alignment means for a compatible tool changer. The use of collet member 149 as part of the tool knock-out mechanism is important because with the drive key arrangement described above, there is no suitable way to otherwise retain the tool holder in a proper vertical location (elevation). While aligning the drive key with the tool holder keyway, the tool holder is advanced upwardly into the counterbored area of the spindle and held there while the cylinder piston is retracted by reverse action of the air in cylinder 124. The belleville spring washers 147 are relieved and thereby able to spring back to their normal condition which is still a moderately spring-loaded condition. This raises the spindle shaft 144 and pulls the collet arms 149A back into the smaller cylindrical bore 150 where the collet arms are drawn inwardly to fit snugly around the head portion of the tool holder. The retracting collet arms are guided by their own exterior shape and by chamfered surface 150A.

A still further feature of tool support member 120 is the incorporation of a disc brake 160 which cooperates with disc 161 (secured to spindle coupling 143) for emergency stopping of the spindle. As previously described, shutting off the drive motor begins the deceleration of the spindle and once the rpm rate is low enough, the plunger 92 of cylinder 91 extends into position. However, the time cycle by this procedure for the spindle to come to a complete stop is unacceptable if rapid emergency braking is necessary. Disc brake 160 and disc 161 are equally applicable for the FIG. 9 arrangement and a suitable disc brake is a model P10SAF offered by Tol-O-Matic of Minneapolis, Minn.

Earlier in the description of this invention, mention was made of the fact that FIG. 11 represents the exemplary embodiment with respect to the bearing way assemblies employed within the present invention. It should be noted, however, that the particular construction of the FIG. 11 bearing ways necessitates a slightly different tool support member frame arrangement. Referring to FIG. 11, frame 165 includes two oppositely disposed and outwardly extending flange members 166 and 167. These two flange members are located more to the front of the milling machine than are flange members 25a and 25b of the alternative FIG. 5 arrangement. Two bearing ways 168 and 169 are bolted in place between their corresponding flange members 166 and 167 and support plates 170 and 171. Support plates 170 and 171 are attached to outwardly extending arms 29.

The positional relationship between the tool support member (and the spindle axis P') and the outwardly extending arms 29 is preserved from the FIG. 5 arrangement to the FIG. 11 arrangement. However, it is to be noted that the vertical plane containing axis P' and which is parallel with the plane of vertical travel of the tool support member 120, intersects bearing ways 168 and 169 at the outermost line of contact between the track shaft and the bearing case. The increased thickness of bearing ways 168 and 169 over that of bearing ways 39 is accommodated by the position of the outwardly extending flange members 166 and 167. Support plates 170 and 171 provide a means to accommodate the difference in width between the two bearing way styles. Each bearing way includes a bearing case 168A, 169A and a track shaft 169A, 169B, and these types of bearing ways are described in U.S. Pat. No. 3,897,982 issued Aug. 5, 1975 to Teramachi and in U.S. Pat. No. 3,938,854 issued Feb. 17, 1976 to Teramachi, both of which are hereby incorporated by reference. Such bearing ways are commercially offered by the THK Company Ltd. of Tokyo, Japan, and a suitable type for the application disclosed herein is an NSR 40BA-XXX wherein the three X's are to be replaced with digits signifying the desired track length in millimeters. Although the Teramachi design discloses a single track shaft and a single bearing case, the subject milling machine incorporates two bearing cases riding on each track shaft. These two cases are spaced apart and provide excellent rigidity, stability and smooth travel.

Although only a single motor and single spindle system has been described in the various illustrated arrangements, it is to be understood that the concepts of removable ball bearing ways for the tool support member and the removable ball bearing ways for the tool support member and the direct coaxial connection between the hollow spindle and its drive motor are principles which are equally applicable to multiple-spindle milling machines. With such multiple-spindle machines, the width of the C-shaped frame would necessarily increase and multiple tool support member assemblies may be mounted on a correspondingly increased number of outwardly extending arms 29. Likewise, some of the features disclosed herein are equally applicable for use with different types of milling machines or milling operations other than the conventional knee-and-column-type milling machines. For example, the removable ball bearing way concept and the direct coaxial drive concept could be employed on transfer base milling, reciprocable milling and string milling with virtually no modification needed to what has already been described.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A knock-out mechanism for spindle-driven tool holders and tooling attachments comprising:
    a cylinder body suitably adapted for operation as part of a double-action air cylinder;
    a cylinder piston including a smaller-diameter center portion and a larger-diameter surrounding annular flange portion and being disposed within said cylinder body and movable between an extended position and a retracted position in response to air pressure forces generated within said cylinder body on opposite sides of said surrounding annular flange portion;
    a spindle assembly including a hollow spindle and having a proximal end arranged for coupling to a motor output shaft;
    a spring-loaded tool collet assembly disposed within said spindle assembly and movable in response to said cylinder piston movement, said tool collet assembly comprising:
        (a) a spindle shaft concentrically disposed within said hollow spindle; and
        (b) a release bar concentrically disposed between said spindle shaft and said cylinder piston and disposed in abutting engagement across one end of said spindle shaft; and
    said spindle assembly further having a distal end cooperatively arranged with said spring-loaded tool collet assembly for alternately retaining and releasing tool attachments in response to downward movement of said release bar.

2. The knock-out mechanism of claim 1 wherein said cylinder body includes a first annular ring member and secured thereto a second annular ring member, said two annular ring members being configured so as to define an annular groove therebetween, said annular flange being positioned within said annular groove.

3. The knock-out mechanism of claim 2 wherein said cylinder body includes an annular groove and inlet/outlet ports on opposite sides of said annular groove.

4. The knock-out mechanism of claim 1 wherein said spindle assembly further includes a proximal end hollow coupling arranged to couple said hollow spindle to said motor output shaft for transmitting rotary motion to said hollow spindle, the distal end of said spindle assembly including a first portion defining a first cylindrical bore and a second portion defining a larger cylindrical bore contiguous to the end of said first cylindrical bore.

5. The knock-out mechanism of claim 1 wherein said tool collet assembly further includes a tool collet attached to the distal end of said spindle shaft, said tool collet having collet arms and being movable in response to cylinder piston movement between a tool clamped position wherein said collet arms are within said first cylindrical bore and a tool released position wherein said collet arms are within said larger cylindrical bore.

6. The knock-out mechanism of claim 1 which further includes a longitudinal stack of belleville washers and said collet arms are suitably adapted so as to be inwardly spring-loaded when disposed within said first cylindrical bore.

7. A tool-release mechanism associated with the spindle drive motor of a milling machine and the like comprising:
    air actuator means disposed in an annular ring arrangement around the output shaft of said spindle drive motor;
    a tool spindle directly coupled to said output shaft;
    a tool collet disposed within said tool splindle and movable in response to movement of said air actuator means between a tool-clamped position and a tool-released position;

a hollow cylindrical coupling attached to one end of said tool spindle and arranged for attachment to said output shaft;

a spindle shaft disposed within said tool spindle;

a stacked series of belleville spring washers disposed about said spindle shaft;

a release bar abuttingly engaging one end of said spindle shaft and rotatable with said output shaft and movable in a longitudinal direction in response to movement of said air actuator means; and said tool collet being attached to the other opposite end of said spindle shaft and including a plurality of collet arms.

* * * * *